Oct. 13, 1925.
J. BATH ET AL
1,556,666
ADJUSTABLE INTERNAL GAUGE
Filed April 18, 1921
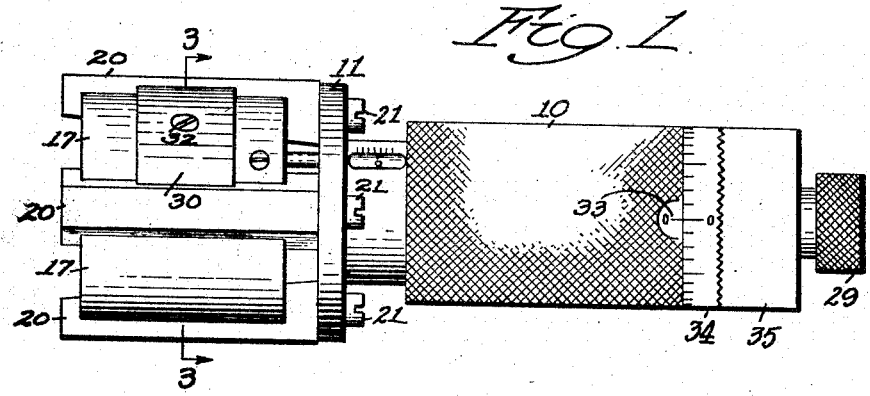
Fig. 1
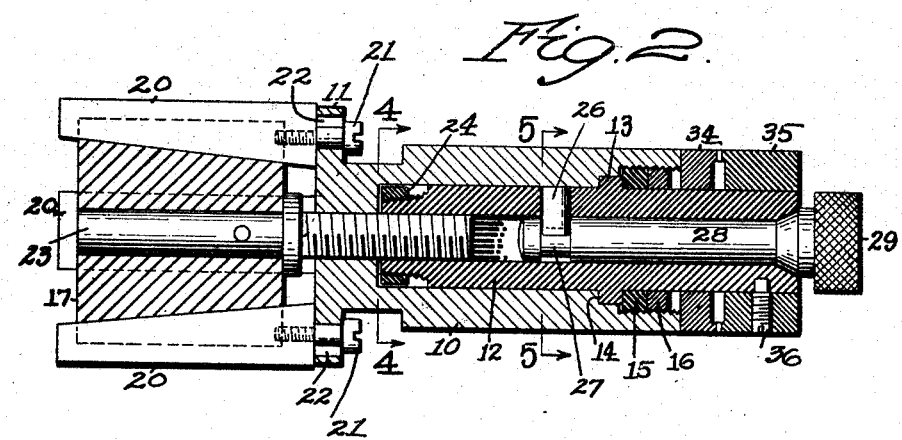
Fig. 2
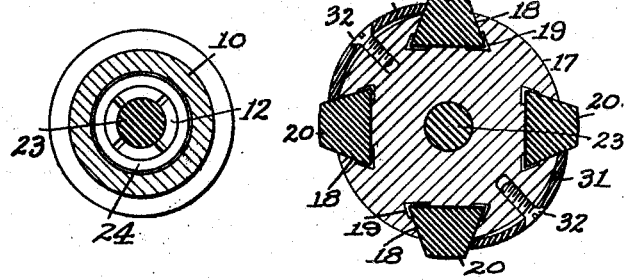
Fig. 4
Fig. 3
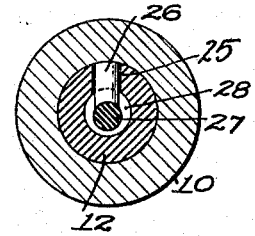
Fig. 5
Inventors
John Bath
Stanley W. Bath Patented Oct. 13, 1925.

1,556,666

UNITED STATES PATENT OFFICE.

JOHN BATH AND STANLEY W. BATH, OF WORCESTER, MASSACHUSETTS; SAID STANLEY W. BATH ASSIGNOR TO SAID JOHN BATH.

ADJUSTABLE INTERNAL GAUGE.

Application filed April 18, 1921. Serial No. 462,142.

*To all whom it may concern:*

Be it known that we, JOHN BATH and STANLEY W. BATH, citizens of the United States, residing at Worcester, in the county of Worcester and State of Massachusetts, have invented a new and useful Adjustable Internal Gauge, of which the following is a specification.

This invention relates to an adjustable gauge by which internal dimensions may be accurately determined or compared.

It is the object of our invention to provide a gauge for this purpose comprising relatively few parts of simple construction which combine to produce results of great utility.

With this general object in view, important features of our invention relate to novel constructions in the parts which move and position the gauge bars; to improved means for locking the gauge at a desired setting; to means for taking up wear of the different parts; and to other arrangements and combinations of parts which will be hereinafter described and more particularly pointed out in the appended claims.

A preferred form of our invention is shown in the drawings in which—

Fig. 1 is a side view of our improved gauge;

Fig. 2 is a sectional longitudinal elevation thereof; and

Figs. 3, 4 and 5 are transverse sectional views taken along the line 3—3 in Fig. 1 and the lines 4—4 and 5—5 in Fig. 2, respectively.

Referring to the drawings, we have shown an adjustable internal gauge comprising a body or handle 10 having an outwardly enlarged or flanged portion 11 at one end thereof. An internally threaded sleeve 12 is rotatable in a recess or chamber in the body 10 and a flange 13 on the sleeve engages an internal shoulder 14 in the body 10. Lock nuts 15 and 16 are threaded in the end of the body 10 and hold the flange 13 closely against the shoulder 14.

A head 17 is provided with a plurality of dove-tailed guide ways 18 which are inclined to the axis of the gauge and which are preferably relieved or cut away at their acute inner angles as shown at 19 (Fig. 3). Gauge bars 20 of similar dove-tailed cross-section are mounted for relative sliding movement in the guide ways 18. Such movement is produced by motion of the head 17 relative to the body 10, as the gauge bars are provided with studs 21 extending through slots 22 in the flange 11 and preventing relative longitudinal movement of the gauge bars relative to the body 10.

The head 17 is fixed on a threaded rod or shaft 23 which extends through a bearing in the end of the body 10 and is threaded in the sleeve 12. The inner end of the sleeve 12 is slotted as shown in Fig. 4 and an adjusting nut 24 is threaded on its tapered outer surface. Provision is thus made for adjusting the threaded sleeve to the rod 23 and for taking up wear between the parts.

It is frequently desirable to lock the gauge in an adjusted position and for this purpose a transverse opening 25 is provided in the wall of the sleeve 12. A plug 26 is mounted in the recess or opening 25 with its outer end preferably convex to engage the inner surface of the body 10 and its inner end concave to engage a reduced eccentric portion 27 of a locking pin 28. The pin 28 is freely rotatable in the sleeve 12 and is conveniently provided with a knurled head 29 by which it may be turned.

When the parts are in the position shown in Figs. 2 and 5, the plug 26 does not engage the body 10 and the sleeve 12 may be rotated as desired. As the pin 28 is given a partial rotation, the eccentric 27 acts as a cam to force the plug 26 outward and lock the gauge.

Binding plates 30 and 31 are provided on the head 17 for seating the bars 20 firmly in the guide ways 18. Reference to Fig. 3 will show that the plates 30 and 31 are more sharply curved than the surface of the head 17, so that their effective length may be increased by tightening the binding screws 32. In this way any wear of the gauge bars may be taken care of. Each binding plate provides adjustment for two gauge bars 20, so that only one half as many plates are required as there are bars in the gauge.

For reading the adjustment of the gauge we provide a zero or index mark 33 on the body 10 and a graduated ring 34 loosely mounted on the sleeve 12 and having radial serrations or teeth on one end face engaged by corresponding teeth on the adjacent end of a collar 35 positioned on the sleeve 12 by a stud or screw 36.

The zero on the ring 34 may be adjusted to the index mark 33 by removing the screw 36 so that the collar 35 may be moved outward on the sleeve 12 until the teeth on the collar and ring are disengaged, after which the ring may be brought to the desired position in which it will be held by the collar 35 when the screw 36 is again inserted.

The provision of the clearance spaces 19 at the angles of the guide ways 18 is of considerable importance in the manufacture of the gauge as it permits the guide ways to be conveniently finished by grinding or polishing, thus producing a very close sliding fit which would be otherwise impossible of achievement.

Having thus described our invention it will be evident that changes and modifications can be made therein by those skilled in the art within the spirit and scope of our invention as set forth in the claims, and we do not wish to be otherwise limited to the details herein disclosed but what we claim is:—

1. An adjustable internal gauge comprising an elongated body, an internally threaded sleeve mounted for angular movement only in said body, a head having a projection threaded into said sleeve and having dove-tailed guide ways therein inclined toward the axis of the gauge, a plurality of gauge bars mounted in said guide ways, and means to prevent axial movement of said gauge bars relative to said body.

2. An adjustable internal gauge comprising an elongated body, an internally threaded sleeve mounted for angular movement only in said body, a plurality of gauge bars, actuating means for said bars having threaded connection to said sleeve and through which means said bars may be adjusted radially by angular movement of said sleeve, and means to hold said sleeve in angularly adjusted position in said body said means comprising a locking plug radially disposed relative to said sleeve and an actuating member disposed axially of said sleeve and effective to force said locking plug away from the axis of said sleeve by angular movement of said member.

3. In an adjustable internal gauge, a body, a recessed member mounted for angular movement only in said body, and means to hold said member in adjusted angular position in said body, said member having a transverse recess and said means comprising a plug in said transverse recess adapted to engage the inner face of said body and a rotatable locking pin having a cam portion effective to engage said plug and force it outward against said body.

4. In an adjustable internal gauge, a body, a recessed member mounted for angular movement only in said body, and means to hold said member in adjusted angular position in said body, said member having a transverse recess and said means comprising a sliding plug in said transverse recess adapted to engage the inner face of said body and a locking pin axially and rotatably disposed in said member and having an eccentric portion effective to engage said plug and force it outward against said body.

5. An adjustable internal gauge having, in combination, a recessed body with an internal shoulder, a flanged internally threaded sleeve rotatable in said body, said flange engaging said shoulder, lock nuts in said body engaging the opposite face of said flange, a head having a projecting portion threaded in said sleeve, and a plurality of gauge bars mounted in said head for radial movement only relative to said body.

6. An adjustable internal gauge having, in combination, a recessed body with an internal shoulder, a flanged internally threaded sleeve rotatable in said body, said flange engaging said shoulder, lock nuts in said body engaging the opposite face of said flange, a head having a projecting portion threaded in said sleeve, and a plurality of gauge bars mounted in said head for radial movement only relative to said body, said body having an outwardly extending end portion against which said bars are held in sliding engagement.

7. In an adjustable internal gauge, an elongated body, a head movable axially relatively to said body and having dove-tailed guide ways inclined to the axis of the gauge, a plurality of gauge bars slidable in said guide ways, and means to seat said bars firmly in said guide ways, said means comprising binding plates mounted on said head between pairs of bars, each engaging a bar at each end, and means to adjustably secure said plates on said head.

8. An elongated adjustable internal gauge comprising a plurality of gauge bars having their inner bearing surfaces inclined to the longitudinal axis of the gauge and their outer gauging surfaces substantially parallel to said axis, a bar-positioning member having a bearing surface extending longitudinally of said gauge and contacting with the inclined bearing surface of each gauge bar, means to produce relative axial movement of said member and gauge bars to adjust said gauge bars radially, means to hold said bars from axial movement with said positioning member but permitting radial movement of said bars, and a plurality of plates mounted on said positioning member between said gauge bars, each plate engaging adjacent bars at the opposite ends of said plate and preventing circumferential movement of said bars relative to said member.

In testimony whereof we have hereunto affixed our signatures.

JOHN BATH.
STANLEY W. BATH.